United States Patent [19]

Tani et al.

[11] Patent Number: 5,756,628
[45] Date of Patent: May 26, 1998

[54] ORGANIC PHYLLOTITANOSILICATE, SHAPED BODY THEREOF, AND METHOD FOR PRODUCING THEM

[75] Inventors: Masaaki Tani; Yoshiaki Fukushima; Kazuo Okamoto; Kazuhisa Yano, all of Aichi, Japan

[73] Assignee: Kabushiki Kaisha Toyota Chuo Kenkyusho, Aichi-ken, Japan

[21] Appl. No.: 814,463

[22] Filed: Mar. 10, 1997

[30] Foreign Application Priority Data

Mar. 11, 1996 [JP] Japan ................................. 8-083300

[51] Int. Cl.$^6$ ................................................ C08G 77/00
[52] U.S. Cl. ........................... 528/9; 528/10; 528/32; 528/38; 528/30; 528/40; 528/39; 528/395; 525/389; 428/446; 428/448; 423/326; 423/325; 423/608
[58] Field of Search ........................... 528/9, 10, 39, 528/395, 30, 32, 40, 38; 525/389; 428/446, 448; 423/326, 325, 608

[56] References Cited

U.S. PATENT DOCUMENTS

| | | | |
|---|---|---|---|
| 4,753,827 | 6/1988 | Yoldas et al. | 427/387 |
| 4,754,012 | 6/1988 | Yoldas et al. | 528/10 |
| 4,799,963 | 1/1989 | Basil et al. | 106/287.13 |
| 4,814,017 | 3/1989 | Yoldas et al. | 106/287.12 |
| 4,859,648 | 8/1989 | Landis et al. | 502/242 |
| 5,378,661 | 1/1995 | Reig et al. | 501/2 |
| 5,527,871 | 6/1996 | Tani et al. | 528/9 |

FOREIGN PATENT DOCUMENTS

| | | |
|---|---|---|
| 63-123828 | 5/1988 | Japan . |
| 63-123838 | 5/1988 | Japan . |
| 2-242864 | 9/1990 | Japan . |

*Primary Examiner*—Margaret W. Glass
*Attorney, Agent, or Firm*—Oblon, Spivak, McClelland, Maier & Neustadt, P.C.

[57] ABSTRACT

The present invention provides an inorganic-organic hybrid material having both the characteristics of the inorganic material and the characteristics of the organic material. The material has a lamellar structure formed by piling a sheet of silicon tetrahedrons upon a sheet of titanium octahedrons. In this lamellar structure, an organic group is bonded to a center atom of a tetrahedron via a covalent bond. The organic group can be polymerized to make the organic phyllotitanosilicate a tough and hard coating material. The hybrid material of the present invention thus has both the characteristics, such as high hardness and heat resistance, of the constitutive inorganic material and the characteristics, such as flexibility and filmability at room temperature, of the constitutive organic material, and further has an excellent UV-blocking property.

15 Claims, 5 Drawing Sheets

2

ORGANIC PHYLLOTITANOSILICATE, SHAPED BODY THEREOF, AND METHOD FOR PRODUCING THEM

BACKGROUND OF THE INVENTION

1. Field of the Invention

The present invention relates to an organic phyllotitanosilicate, a shaped body thereof, and a method for producing them. More precisely, it relates to: an organic phyllotitanosilicate which is advantageously usable in coating compositions and materials for hard coats that are required to have both good ultraviolet-blocking functions and good mechanical characteristics; a shaped body of such an organic phyllotitanosilicate formed through reaction and bonding of the organic moieties in said organic phyllotitanosilicate with each other to have a form of sheet coats or to have any other desired form in accordance with intended objects; and a method for producing such an organic phyllotitanosilicate and a shaped body thereof.

2. Description of the Related Arts

Heretofore have been being used organic ultraviolet-absorbing materials that are generally expected to display an ultraviolet-blocking effect, for example, for surface coating of substances that are poorly resistant to ultraviolet rays, such as polycarbonates, and for surface coating of light-transmitting substances through which ultraviolet rays passing are desired to be cut. However, such organic ultraviolet-absorbing materials are problematic in that they are easily deteriorated and decomposed while used long and therefore their long-lasting ultraviolet-absorbing effect cannot be expected.

Japanese Laid-Open Patent Publication No. 63-45123 has proposed a fine-powdery titanium dioxide composition which is prepared by processing fine-powdery titanium dioxide particles to make them coated with silicon and aluminium oxides and which can be incorporated into films or shaped bodies of resins to thereby block ultraviolet rays so as not to pass therethrough.

However, as being poorly miscible with resins, such an inorganic composition is difficult to uniformly disperse in resins. In addition, when it is formulated into a coating composition, the constitutive inorganic components easily precipitate to shorten the pot life of the composition. Moreover, the addition of such a titanium dioxide powder is still problematic in that the films or shaped bodies comprising the powder has poor transparency.

Japanese Laid-Open Patent Publication No. 63-123838 has proposed an abrasion-resistant and UV-blocking coating composition which comprises a polymer produced from an organoalkoxysilane and an alkoxide of a metal selected from of Ti or Zr.

It is known that, in the sol-gel reaction with a relatively small amount of water to give the composition proposed therein, the alkoxide molecules are apt to bond to each other to give a chain structure. Owing to such their behavior, a highly-transparent sol can be obtained through the reaction. However, since a relatively large amount of Si—OH groups still remain in the resulting sol, the sol must be heat-treated in order to make it have the strength necessary for abrasion-resistant coating. In addition, since the molecules of the polymer product are amorphous, the shelf life of the coating composition comprising the polymer product will be not so good.

Japanese Laid-Open Patent Publication No. 2-242864 has proposed a transparent, abrasion-resistant coat capable of protecting plastic materials such as polycarbonates from ultraviolet rays, which comprises a partially-hydrolyzed alkoxide and a hydroxyl group-having organic compound.

However, this is still problematic in the same issue as Japanese Laid-Open Patent Publication No. 63-123828 mentioned hereinabove.

The present applicants have already proposed an organic phyllosilicate polymer which can be easily produced at about room temperatures without requiring any thermal calcination, which has both the characteristics of organic materials, such as good flexibility and rapid filmability at room temperature, and the characteristics of inorganic materials, such as high hardness and high heat resistance, and which can be used in coating (see U.S. Pat. No. 5,527,871). This polymer is a crystalline polymer having a laminate structure composed of a sheet of tetrahedrons of which the center atom is essentially silicon, and a sheet of octahedrons of which the center atom is at least one metal selected form the group consisting of Mg, Al, Ni, Co, Cu, Mn, Fe, Li, V and Zr, wherein a part or all of the silicons which are the center atoms constituting said sheet of tetrahedrons are bonded to organic groups via covalent bonding therebetween. However, the polymer cannot be expected to be useful as a coat having ultraviolet-blocking functions.

SUMMARY OF THE INVENTION

One object of the present invention is to provide a material which has both good ultraviolet-blocking functions and good mechanical characteristics (for example, abrasion resistance) and which is advantageously usable in coating compositions and hard coats.

Another object of the present invention is to provide an excellent method for producing said material.

The first aspect of the present invention is an organic phyllotitanosilicate comprising: a sheet of tetrahedrons, the tetrahedrons comprising a first center atom selected from the group consisting of Si, or other metal, such as, Al, Fe, Ge and P, wherein a part or all of the first center atom is covalently bonded to an organic group; and a sheet of octahedrons, the octahedrons comprising Ti and a metal besides Ti, such as, Mg, Al, Ni, Co, Cu, Mn, Fe, Li, V and Zr, as a second center atom, the second center atom being occupied by not less than 5 atomic % and less than 100 atomic % of the Ti and by the balance of the metal besides Ti, the sheets of tetrahedrons and octahedrons being joined to form a layered structure.

According to this first aspect of the present invention, the organic phyllotitanosilicate is a hybrid material of which the inorganic structure moiety has a higher-order laminated structure composed of a sheet of tetrahedrons each having, as the center atom, silicon or the other metal, and a sheet of octahedrons each having, as the center atom, Ti and the other metal, and it exhibits excellently the good characteristics, such as high hardness and high heat resistance, of the inorganic materials constituting it.

In the organic phyllotitanosilicate of the present invention, a part or all of the silicons or the other metals that are the center atoms constituting said sheet of tetrahedrons are bonded to organic groups to a desired degree. In this, therefore, the amount of the organic groups introduced is large, or that is, at most from one to three organic groups per one center atom constituting each tetrahedron can be introduced into the sheet of tetrahedrons. Accordingly, if the organic phyllotitanosilicate of the present invention is desired to be used in coating materials, it can ensure the characteristics, such as good flexibility and rapid filmability at room temperature, of the organic material.

In the organic phyllotitanosilicate of the present invention, in addition, the organic side chains are bonded to the center atoms constituting the sheet of tetrahedrons, via tough covalent bonding therebetween. Therefore, even if the organic phyllotitanosilicate is processed in its practical use, for example, in coating materials by mixing it with any other components, the bonding between the organic side chains and the center atoms is not damaged.

Referring to the organic phyllotitanosilicate of the present invention as "an organic material comprising a fine dispersion of layered inorganic substances", it has the following advantages (1) and (2).

(1) It is known that a lamellar-structured clay mineral may interlamellarly absorb a solvent to be swollen, and may be stably and uniformly dispersed in a solvent. Like such a lamellar-structured clay mineral, the organic phyllotitanosilicate of the present invention also can be dispersed highly stably in a solvent, and in addition, it has especially good affinity for organic substances as being coated with organic molecules.

(2) Further, owing to its lamellar-structured inorganic moieties, the organic phyllotitanosilicate of the present invention is expected to have an excellent gas-barrier property. Accordingly, the organic phyllotitanosilicate and even a material comprising it can protect its organic moieties from being oxidized and decomposed by any external water and oxygen, and therefore have excellent weather resistance and heat resistance.

Now that the organic phyllotitanosilicate of the present invention is characterized in that Ti accounts for from 5 to 100 atomic % of all the center atoms constituting the sheet of octahedrons, it exhibits an excellent ultraviolet-blocking effect when used in coating compositions or coating materials. If, however, the proportion of Ti to all the center atoms constituting the sheet of octahedrons is lower than 5 atomic %, the ultraviolet-blocking effect of the coat comprising the organic phyllotitanosilicate is generally lowered in some degree.

The increase in the proportion of Ti to all the center atoms constituting the sheet of octahedrons may relatively lower the degree of crystallinity in the lamellar structure of the organic phyllotitanosilicate, especially in its plane direction (that is, the A-axis direction and the B-axis direction relative to the C-axis direction which is vertical to the layers of the lamellar structure). However, this does not have any negative influence on the heat resistance, the abrasion resistance and the ultraviolet-blocking property of the organic phyllotitanosilicate. The present organic phyllotitanosilicate including Ti as a center atom cannot be seen in any naturally-existing clay materials.

As is obvious from the above, the proportion of Ti to all the center atoms constituting the sheet of octahedrons can be appropriately varied, if desired, to thereby make the organic phyllotitanosilicate have any desired degree of crystallinity.

The second aspect of the present invention is a method for producing an organic phyllotitanosilicate such as that mentioned above for the first aspect of the invention, which comprises: a first step of dissolving or dispersing the following components (a) and (b) and optionally (c) in the following liquid (d) to obtain a solution or a dispersion; and optionally a second step of aging the solution or the dispersion after the first step, thereby obtaining the organic phyllotitanosilicate from the solution or the dispersion:

(a) an organoalkoxysilane having an alkoxy group and an organic group;

(b) an inorganic acid salt of a metal including Ti, an organic acid salt of a metal including Ti, or an alkoxide of a metal including Ti wherein Ti accounts for not less than 5 and less than 100% in terms of the atomic ratio of Ti atoms to all metal atoms;

(c) a silicon alkoxide having an alkoxy group; and (d) a single inorganic polar solvent, a single organic polar solvent, or a mixed solvent of at least two polar solvents.

The method which is the second aspect of the present invention is characterized in that it has made it possible to realize a structure which comprises silicon-containing tetrahedrons of a lamellar-structured clay mineral with the silicon having an organic group as bonded thereto via Si—C covalent bonding therebetween.

A silicon alkoxide as well as the organoalkoxysilane may be introduced into the organic phyllotitanosilicate in the method of the present invention. Because the silicon alkoxide does not have any organic group, it may be used to control the a proportion of the organic groups in an obtained organic phyllotitanosilicate.

Since the method of the present invention does not comprise any ion-exchange reaction for the introduction of the organic group, it is possible to introduce any hardly-ionizing organic group, such as that having an epoxy moiety or that having a terminal amino group, into the phyllotitanosilicate structure. In addition, the method of the second aspect of the present invention is characterized in that the lamellar-structured clay mineral is produced under simple and mild conditions. More details are disclosed in Japanese Laid-Open Patent Publication No. 3-199118 incorporated by reference. Therefore, in the method of the present invention, the organic groups introduced are not deteriorated at high temperatures or under extreme pH conditions.

The amounts of the organoalkoxysilane and optionally silicon alkoxide in the starting system for the method of the present invention may be appropriately adjusted to thereby control the proportion of the organic groups in the organic phyllotitanosilicate to be produced and even to control the degree of expression of the organic characteristics of the organic phyllotitanosilicate as well as the degree of the affinity thereof as a filler for other materials.

In the organic phyllotitanosilicate to be formed in the present invention, the center atoms constituting the sheet of tetrahedrons are not limited to only Si atoms but a part thereof may be other metal atoms. Therefore, a part of the Si atoms of tetrahedrons may be substituted with other metals existing in the starting component (b).

The third aspect of the present invention is a shaped body of an organic phyllotitanosilicate such as that referred to for the first aspect of the invention and having polymerizable functional groups in said organic groups, in which said organic phyllotitanosilicate has been shaped to have a desired shape and in which said organic groups have been bonded to each other through the polymerization of said functional groups.

The shaped body of the third aspect of the present invention retains all the characteristics of the organic phyllotitanosilicate of the first aspect of the invention mentioned hereinabove. In addition, in this, the organic groups have been bonded to each other through the polymerization of the functional groups existing therein. Therefore, the shaped body may have much higher hardness and much more improved heat resistance. The present shaped body is especially suitable for a glazing material, because a number of inorganic polymer layers are laminated tightly and organic groups fixed to the inorganic polymer layers are bonded to each other to further reinforce the shaped body.

The fourth aspect of the present invention is a method for producing a shaped body of an organic phyllotitanosilicate, which comprises: a first step of dissolving or dispersing the following components (a) and (b) and optionally (c) in the following liquid (d) to obtain a solution or a dispersion; and optionally a second step of aging the solution or the dispersion after the first step, thereby obtaining the organic phyllotitanosilicate from the solution or the dispersion, and thereafter shaping the obtained organic phyllotitanosilicate to a desired shape and polymerizing the functional group of the organic group to bond the organic group each other:

(a) an organoalkoxysilane having an alkoxy group and an organic group containing a polymerizable functional group;

(b) an inorganic acid salt of a metal including Ti, an organic acid salt of a metal including Ti, or an alkoxide of a metal including Ti wherein Ti accounts for not less than 5 and less than 100% in terms of the atomic ratio of Ti atoms to all metal atoms;

(c) a silicon alkoxide having an alkoxy group; and (d) a single inorganic polar solvent, a single organic polar solvent, or a mixed solvent of at least two polar solvents.

The process of the method of the fourth aspect of the present invention to prepare the organic phyllotitanosilicate is basically the same as that in the method of the second aspect of the invention mentioned hereinabove. In the fourth aspect, this process is followed by the step of polymerization in which the functional groups on the organic groups are polymerized. This polymerization step is to attain the bonding of the organic groups to each other and can be effected rapidly under simple and mild conditions. In this step, therefore, the organic groups existing in the organic phyllotitanosilicate are not damaged at all.

DETAILED DESCRIPTION OF THE INVENTION

Now, the first to the fourth aspects of the present invention will be described in detail hereinunder.

The organic phyllotitanosilicate of the first aspect of the invention includes those having a so-called 2:1 structure in which two sheets of tetrahedrons are formed on both surfaces of a sheet of octahedrons, and those having a so-called 1:1 structure in which one sheet of tetrahedrons is formed on only one surface of a sheet of octahedrons. Where one desires to make the organic phyllotitanosilicate have many organic groups or where one desires to improve the bonding strength between the organic groups existing in the organic phyllotitanosilicate, those having such a 2:1 structure are more preferred.

Figure 1:
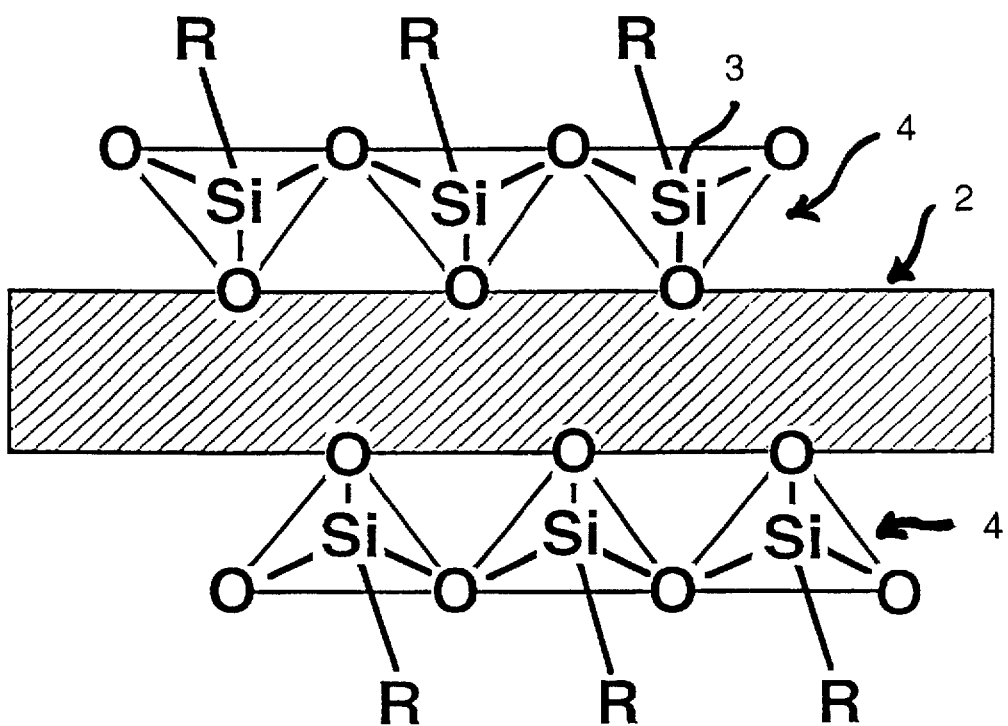
FIG. 1 is a view showing the crystal structure of an organic phyllotitanosilicate of the present invention.

FIG. 1 shows a partial structure of one embodiment of the organic phyllotitanosilicate having a 2:1 structure of the present invention, in which the center atom in each tetrahedron constituting the sheet of tetrahedrons is silicon and each silicon atom has one organic group bonded thereto. In this, two sheets 4 of tetrahedrons are formed on both surfaces of the sheet 2 of octahedrons each having a metal such as Ti or the like as the center atom, where each tetrahedron has the silicon atom 3 as the center atom. Each silicon atom 3 has an organic group R as bonded thereto through covalent bonding therebetween, the organic group R thus constituting a part of each sheet 4 of tetrahedrons.

The structure mentioned above is similar to that of a naturally-existing smectite. In the former, however, the degree of crystallinity in the layers of the lamellar structure illustrated (that is, in the A-axis direction and the B-axis direction relative to the C-axis direction which is vertical to each layer) is low, and no distinct periodicity is admitted therein through X-ray diffraction or the like. This may be considered because at least a part of the center atoms constituting the sheet of octahedrons are Ti atoms. Therefore, if the proportion of Ti atoms to all the center atoms constituting the sheet of octahedrons is lowered, the degree of crystallinity of the structure may be increased.

Apart from the case illustrated where the center atom in each tetrahedron is silicon, a part or all of the center atoms constituting the sheet of tetrahedrons may be Ti, Al, Fe, Ge, P, etc. Such center atoms of Ti, Al, Fe, Ge, P and others may be introduced into the structure by substitution of the center atoms of silicons with any of these. The center atoms constituting the sheet of octahedrons may be at least one metal atom selected from Ti, Mg, Al, Ni, Co, Cu, Mn, Fe, Li, V and Zr, where Ti shall account for from 5 to 100 atomic % of all the center atoms. The proportion of the Ti atoms falling within the defined range has some influences on the degree of crystallinity of the organic phyllotitanosilicate and also on the ultraviolet-blocking function thereof.

The organic group as referred to herein shall not include alkoxy groups. Excepting alkoxy groups, the organic group may include any groups capable of being introduced into organic phyllotitanosilicates to thereby make the polymers have characteristics of organic materials. One typical example of the organic group is an alkyl group. The organic group may have at its terminal, any polymerizable functional group, such as any of acrylic, methacrylic, epoxy, amino, and mercapto groups. A part or all of the center atoms constituting the sheet of tetrahedrons may have from 1 to 3 organic groups as bonded thereto via covalent bonding therebetween.

The organic phyllotitanosilicate of the present invention in which the organic groups do not have any polymerizable functional group can be dispersed, as a filler, in coating compositions, resins and others. On the other hand, the organic phyllotitanosilicate of the present invention in which the organic groups have a polymerizable functional group can be used for forming the shaped body of the third aspect of the present invention, which will be described in detail hereinunder.

In the second aspect of the present invention, water is added to an organoalkoxysilane, $R_xSi(OR')_{4-x}$ (where R represents an organic group; R' represents an alkyl group having a low molecular weight), and a titanium alkoxide, to thereby make the latter two reacted and bonded with each other to give an organic phyllotitanosilicate. Through this reaction, Rs are introduced into the structure of the resulting organic phyllotitanosilicate to form the organic side chains therein.

It is known that the mechanism in forming a network structure comprising Si—O—Si through sol-gel reaction generally differs, depending on the pH of the solution of the reaction system and on the amount of water existing in the reaction system, while resulting in the variation in the properties of the hydrolysis to be obtained through the reaction. Precisely, in the system having excess water existing therein, the alkoxy groups are apt to be completely hydrolyzed to give Si(OH)$_4$ groups, which are then three-dimensionally crosslinked to give a porous silica where the particles constituting it have grown to be large. On the other hand, in the system having not much water existing therein, the alkoxy groups are partially hydrolyzed, resulting in the presence therein of many HOSi(OR')$_3$ and (HO)$_2$Si(OR')$_2$ groups, which are then one-dimensionally or chain-wise bonded to each other to give a cobwebbing sol. It is said that the mechanism in the reaction to occur in the system having a high pH value may be the same as that in the system having excess water existing therein, while that in the reaction to occur in the system having a low pH value may be the same as that in the system having not much water existing therein.

In the prior art where the hydrolysates of a titanium alkoxide, an organoalkoxysilane, and/or a silicon alkoxide are reacted with each other and the resulting product is desired to be used in coating compositions or coating materials, the system having not much water existing therein has been generally employed for the hydrolysis to give a chain-like hydrolysate. This is because the formation of three-dimensionally crosslinked, large particles through said reaction is undesirable. As opposed to this knowledge, however, we, the present inventors have found, after having been investigated various conditions for hydrolysis, that the favorable lamellar structure of the organic phyllotitanosilicate of the present invention can be formed through complete hydrolysis of the alkoxy groups in the starting materials to give R$_x$Si(OR')$_{4-x}$ and Ti(OH)$_4$ with restricted two-dimensional crosslinking in Rs of the organoalkoxysilane R$_x$Si(OR')$_{4-x}$. One embodiment of the method of the present invention comprises the following steps (1) to (3).

(1) A titanium alkoxide and an organoalkoxysilane are well mixed. The molar ratio of titanium alkoxide/organoalkoxysilane may be from 1/3 to 2/1, preferably from 1/2 to 1/1. It is desirable that the reaction system is diluted with a water-soluble organic solvent, such as a well-dewatered lower alcohol or acetone. If a silicon alkoxide is added to this reaction system, silicons with no organic side chain bonded thereto can be introduced into the layer of silicon oxide tetrahedrons, whereby the amount of the organic groups in the structure to be formed through the reaction can be controlled. A part or a majority (up to 95%) of said titanium alkoxide may be substituted with salts or alkoxides of any metal of Mg, Al, Ni, Co, Cu, Mn, Fe, Li, V or Zr, whereby a part of titanium atoms in the sheet of octahedrons may be substituted with any metal elements of Mg, Al, Ni, Co, Cu, Mn, Fe, Li, V or Zr as in natural clay minerals. Depending on the degree of said substitution, the sheet of octahedrons may have some crystallinity. It is known that iron and aluminium can be substituted for silicon in the sites of silicon tetrahedrons.

(2) Water is added to the above with stirring. The amount of water to be added may be such that the concentration of the titanium alkoxide + organoalkoxysilane in the solvent may be not larger than 100 mols/liter, more preferably not larger than 10 mols/liter. Thus is formed an organic phyllotitanosilicate immediately. Any catalyst capable of promoting the hydrolysis and dehydrating condensation of the alkoxide may be added to the reaction system. In sol-gel reaction, any of acid catalysts and alkaline catalysts may be used. In the method of the present invention, however, alkaline catalysts capable of more completely hydrolyzing alkoxy groups are suitably used.

(3) The organic phyllotitanosilicate thus formed is collected. For this, the reaction mixture may be filtered or, alternatively, may be directly dried. However, if any non-volatile catalyst was used in the previous step, the reaction mixture must be filtered and the residue collected must be washed with water.

It is believed that the mechanism in the production of the organic phyllotitanosilicate will be as follows. Of the titanium alkoxide and the organoalkoxysilane, the titanium alkoxide having a higher degree of reactivity is first hydrolyzed to give Ti(OH)$_4$. Then, Ti(OH)$_4$ promotes the hydrolysis of the organoalkoxysilane, and bonds to the resulting hydrolysate of the organoalkoxysilane. If these titanium alkoxide and organoalkoxysilane are sufficiently diluted in the solvent, they are not randomly and three-dimensionally crosslinked one after another, but units of R'—Si—O—Ti—O—Si—R' are formed. In the resulting units, the behavior of Ti to be coordinated in hexa-coordination and the behavior of R' to be oriented in layer will induce the bonding of the units to each other via —O—Ti—O— to give the intended lamellar structure.

The organoalkoxysilane of the component (a) gives the center atom of each tetrahedron structure and the organic group to the organic phyllotitanosilicate of the present invention, and this shall have at least one alkoxy group (this group is necessary for the bonding of the center atom, silicon in the tetrahedron structure to the octahedron structure in the organic phyllotitanosilicate) and at least one organic group. In this, the molar ratio of the alkoxy group to the organic group may vary from 3:1 to 1:3.

The inorganic salt, organic salt or alkoxide of the metal of the component (b) gives the center atom of each octahedron structure to the organic phyllotitanosilicate of the present invention. As the metal in (b), employable is at least one of Ti, Mg, Al, Ni, Co, Cu, Mn, Fe, Li, V and Zr. The inorganic acids and organic acids to form salts with the metals are not specifically defined. Of the component (b), however, the inorganic salt, organic salt or alkoxide of Ti must account for from 5 to 100% in terms of the atomic % of Ti of the metal atoms. A part of these metals may often be substituted for the center atom, silicon in the sheet of tetrahedrons constituting the organic phyllotitanosilicate of the present invention during the process of this second aspect of the present invention of producing the polymer with a lamellar structure.

The silicon alkoxide of the component (c) is optionally used, if desired, along with the organoalkoxysilane for the purpose of controlling the content of the organic groups to be in the organic phyllotitanosilicate in the present invention. This silicon alkoxide shall have at least one alkoxy group but does not have any organic group. This may have from one to four alkoxy groups.

By suitably selecting the ratio of (a) [or (a) and (c)] to (b) to be in the reaction system, the organic phyllotitanosilicate of either the 2:1 type or the 1:1 type mentioned above can be selectively produced. In short, the selection is to determine the equivalent ratio of the center metal atoms, such as Ti or other metal atoms, to be in the sheet of octahedrons to the center atoms, silicons to be in the sheet of tetrahedrons in the organic phyllotitanosilicate to be produced.

For example, when the molar ratio of the former metal atoms to the latter silicon atoms is approximately from 1/0.5 to 1/1 or so, organic phyllotitanosilicates of 1:1 type may be produced, and when it is approximately from 1/2 to 3/4 or so, those of 2:1 type may be produced.

The gelling process may be immediately finished or may require aging in some degree (for example, for about one or two days), depending on the starting system and the reaction condition employed. The organic phyllotitanosilicate produced may be recovered as a dry powder thereof, after the solvent is removed, or alternatively, it may be directly used as it is in gel to form coating materials.

In the third aspect of the present invention, the polymerizable functional group typically includes hetero atoms and unsaturated bonds. Two such functional groups may be polymerized. For this, for example, mentioned is a combination of an amino group and a carboxyl group that may form an amido bond. Anyhow, the polymerizable functional group as referred to herein is not specifically defined as long as it is functional to induce polymerization.

The others than the above-mentioned points in the third aspect of the invention are the same as those in the first aspect thereof mentioned hereinabove.

Regarding the shape of the shaped body of the organic phyllotitanosilicate in the fourth aspect of the present invention, for example, if the shaped body is a coating film, its shape is filmy, while if it is shaped in a mold or frame, its shape is the same as the shape of the mold or frame used. Anyhow, the means and the process of producing the shaped body and even the shape of the shaped body thus produced are not specifically defined at all, but may be varied unlimitedly depending on the use of the shaped body itself of the third aspect of the invention.

After the shaping to give any desired shaped bodies, the functional groups existing in the shaped bodies may be polymerized by any desired known means, for example, under heat. Anyhow, the means for the polymerization is not specifically defined.

The others than the above-mentioned points in the fourth aspect of the invention are the same as those in the second aspect thereof mentioned hereinabove.

EMBODIMENTS OF THE INVENTION

Example 1
Production of Organic Phyllotitanosilicate 297.6 g of 3-methacryloxypropyltrimethoxysilane and 170.4 g of titanium tetraisopropoxide were diluted with 5 liters of methanol, and well stirred. The resulting mixture was added to 24 liters of ion-exchanged water, and well stirred. This was left as it was for one day, and the organic phyllotitanosilicate formed was collected through filtration. This was then dried in vacuum to obtain 143 g of a powder of organic phyllotitanosilicate.

Figure 2:
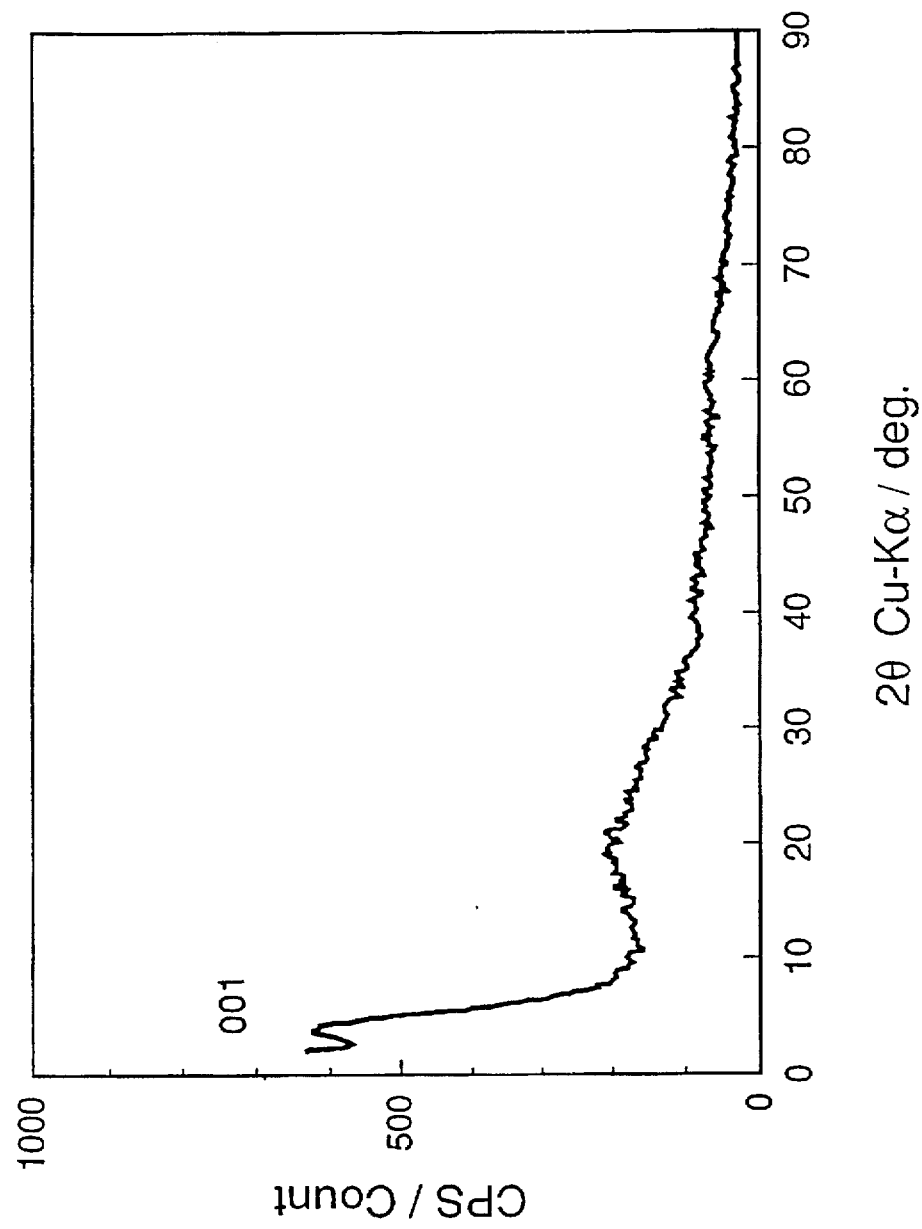
FIG. 2 is a graph showing the XRD pattern of an organic phyllotitanosilicate of the present invention.
Figure 3:
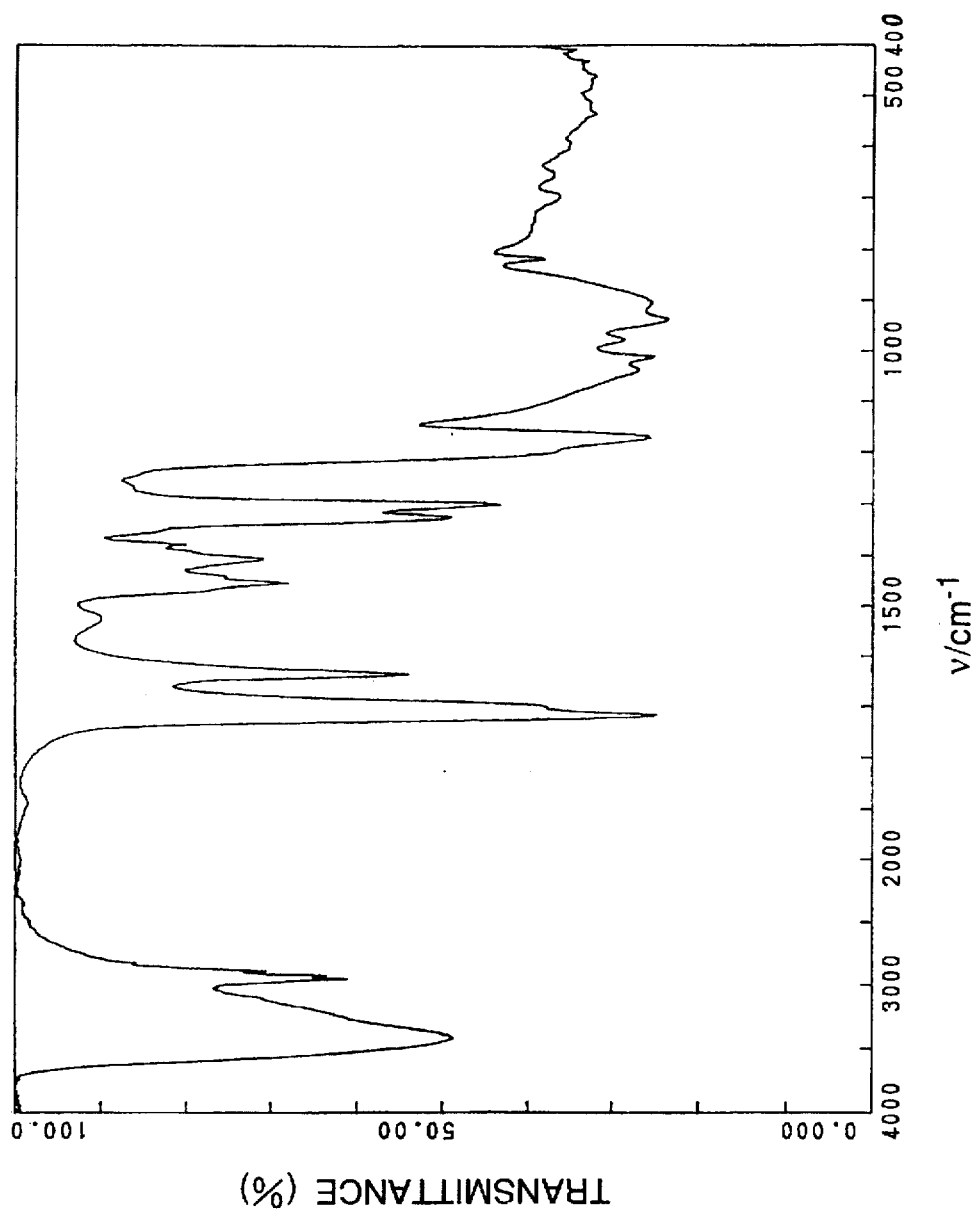
FIG. 3 is a chart from infrared spectroscopy of an organic phyllotitanosilicate of the present invention.

The X-ray diffraction of the powder gave a smectite-like pattern, as in FIG. 2, in which a peak of 001 appeared. This pattern suggests the formation of a crystalline layer structure in the product. On the other hand, the infrared (IR) absorptiometry of the powder gave the chart of FIG. 3, in which are seen a peak at 1720 cm$^{-1}$ (carbonyl group) and a peak at 1640 cm$^{-1}$ (C=C double bond). These two peaks verify the existence of acrylic groups in the product.

Figure 4:
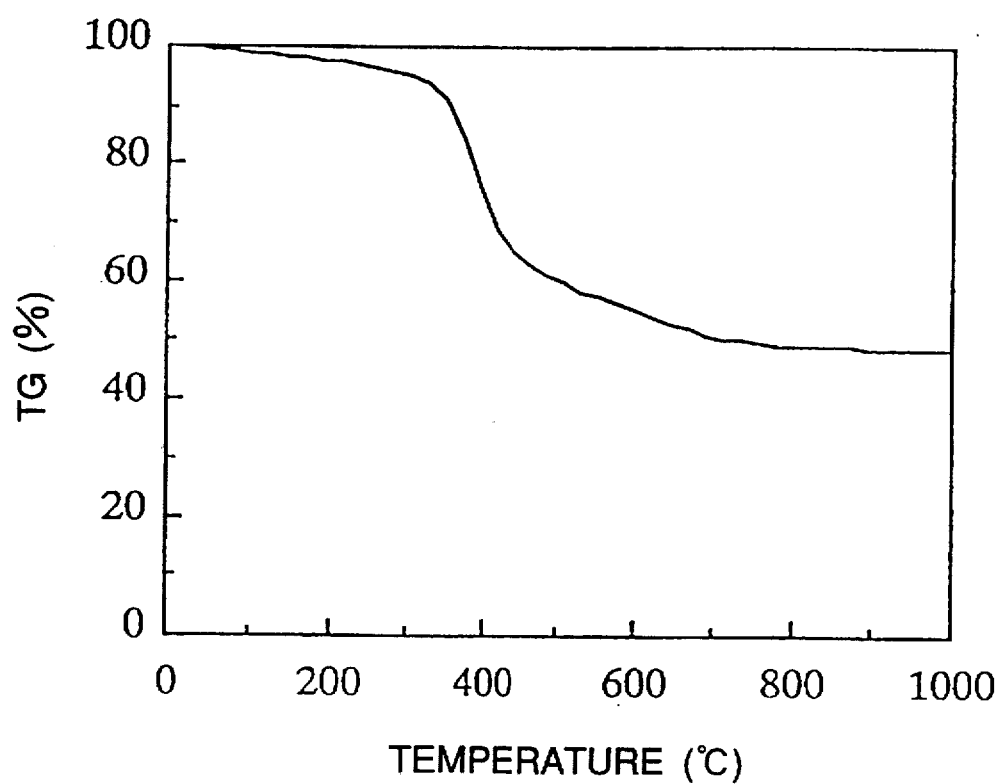
FIG. 4 is a graph showing the thermogravimetric loss (TG) in an organic phyllotitanosilicate of the present invention.

The data of the thermogravimetry (TG) of the product gave the graph of FIG. 4, in which is seen almost no thermogravimetric loss at temperatures up to about 350° C. The data verify the heat resistance of the organic groups existing in the organic phyllotitanosilicate obtained herein.

Example 2
Dispersion of Organic Phyllotitanosilicate in Organic Solvent

Using a sand mill, the organic phyllotitanosilicate obtained in the above was dispersed in an organic solvent. Precisely, 18 g of the organic phyllotitanosilicate and 72 g of butanol were stirred along with 200 g of glass beads having a diameter of 1 mm in a sand mill, at 2000 rpm for 3 hours. Thus was obtained a semi-transparent dispersion of the organic phyllotitanosilicate in butanol.

Example 3
UV Absorption Spectrometry

The dispersion of organic phyllotitanosilicate in butanol prepared above was applied onto a quartz glass slide (thickness: 1 mm) according to a flow-coating method. This was dried at room temperature for 30 minutes, and a transparent film was formed on the slide. The film was subjected to UV absorption spectrometry at the wave length of from 190 to 500 nm, using a UV spectrophotometer in which the width of the slit was 1 mm. The data obtained are shown in FIG. 5 as the curve of Ti, from which it is known that the organic phyllotitanosilicate film exhibited an ultraviolet-blocking effect for rays of about 350 nm or shorter and that the film is effective for blocking almost all UV rays of 300 nm or shorter (see the spectral curve of "Ti" in FIG. 5).

Figure 5:
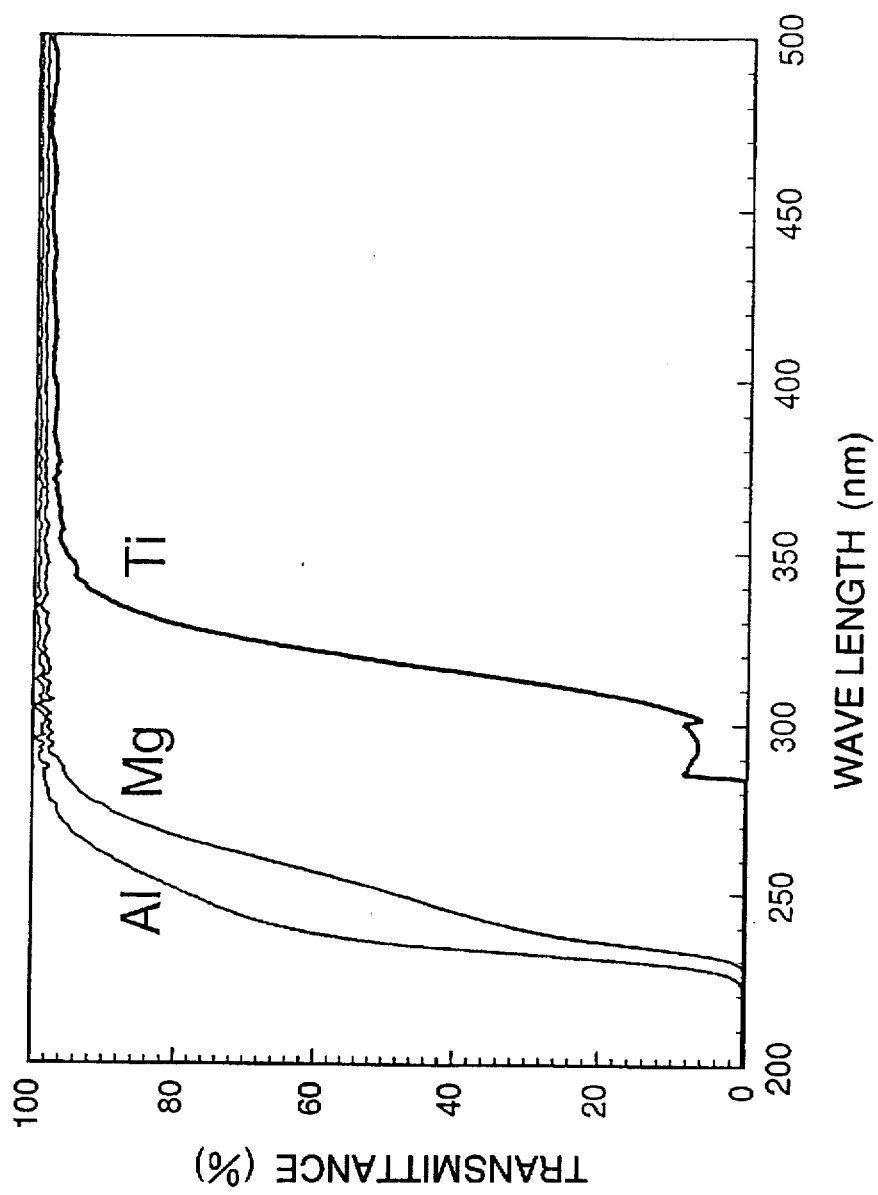
FIG. 5 is a graph showing UV absorption spectra, in which Ti indicates the spectrum of an organic phyllotitanosilicate film of the present invention, "Al" indicates that of a methacrylic phylloaluminosilicate film, and "Mg" indicates that of a methacrylic phyllomagnesiumsilicate film.

The spectral curves of "Al" and "Mg" in FIG. 5 indicate a methacrylic phylloaluminosilicate film and a methacrylic phyllomagnesiumsilicate film, respectively, having an aluminium or magnesium atom in the center of each octahedron-structured site in the organic phyllosilicate of each film. The structures of the methacrylic phylloaluminosilicate film and the methacrylic phyllomagnesiumsilicate film are almost the same as the structure of the organic phyllotitanosilicate film prepared hereinabove, except that the former two have a layer of aluminium-centered octahedrons or magnesium-centered octahedrons, respectively, in place of the titanium oxide layer in the latter.

The methacrylic phylloaluminosilicate film and the methacrylic phyllomagnesiumsilicate film were prepared in the manner mentioned below.

24.2 g of aluminium chloride hexahydrate was dissolved in 4000 ml of ion-exchanged water with stirring well. To this was added 49.6 g of 3-methacryloxypropyltrimethoxysilane that had been diluted with 1000 ml of methanol, and further stirred. To this was added 300 ml of an aqueous solution of 1N sodium hydroxide at a rate of 180 seconds/ml. After having been left at room temperature for 3 days, the resulting mixture was filtered and washed with water to collect the precipitate. This was then dried in vacuum to obtain a methacrylic phylloaluminosilicate.

A methacrylic phyllomagnesiumsilicate was obtained in the same manner as above. Precisely, 20.4 g of magnesium chloride hexahydrate was dissolved in 4000 ml of ion-exchanged water with stirring well. To this was added 49.6 g of 3-methacryloxypropyltrimethoxysilane that had been diluted with 1000 ml of methanol, and further stirred. To this was added 200 ml of an aqueous solution of 1N sodium hydroxide at a rate of 180 seconds/ml. After having been left at room temperature for 1 day, the resulting mixture was filtered and washed with water to collect the precipitate. This was then dried in vacuum to obtain a methacrylic phyllomagnesiumsilicate.

These two organic phyllosilicates were separately dissolved in an organic solvent, using a sand mill. Precisely, 18 g of the organic phyllosilicates and 72 g of butanol were stirred along with 200 g of glass beads having a diameter of 1 mm in a sand mill, at 2000 rpm for 3 hours. Thus were obtained a semi-transparent dispersion of the organic phylloaluminosilicate in butanol, and a semi-transparent dispersion of the organic phyllomagnesiumsilicate in butanol.

The dispersions were separately applied onto a quartz glass slide (thickness: 1 mm) according to a flow-coating method at an angle of 40 degrees. The thus-coated slides were dried at room temperature for 30 minutes. A transparent methacrylic phylloaluminosilicate film and a transparent methacrylic phyllomagnesiumsilicate film were separately formed on each slide. Comparing these films with the above-mentioned organic phyllotitanosilicate film of the present invention, it is obvious that the organic phyllotitanosilicate film specifically exhibits a UV-blocking effect for UV rays of about 350 nm or shorter, and almost completely blocking UV rays of about 300 nm or shorter.

Example 4
Formation of Hard Coat Film 0.36 g of a photopolymerization initiator, benzoin isopropyl ether was added to the dispersion of organic phyllotitanosilicate in butanol that had been prepared in the above, then stirred for 15 minutes, and thereafter ultrasonically stirred for 30 minutes using an ultrasonic washer. The resulting mixture was applied onto an injection-molded polymethyl methacrylate plate (100 mm×100 mm) at an angle of 40 degrees, according to a flow-coating method. This was then directly dried at room temperature for 15 minutes, and then exposed to UV rays from a high-pressure UV lamp, for 30 minutes. Thus, the coated liquid was cured to give a hard coat film. The hardness of the film thus formed was measured, according to a JIS pencil strength test, to be 9H.

Example 5

100 ml of an aqueous solution of sodium hydroxide was added to 4000 ml of ion-exchanged water, and well stirred. To this was added a solution as prepared by diluting 49.6 g of 3-methacryloxypropyltrimethoxysilane, 17.0 g of titanium butoxide and 11.9 g of nickel chloride hexahydrate with 100 ml of methanol followed by well stirring them. The resulting mixture was left at room temperature for 3 days, then filtered and washed with water. Then, the precipitate was collected and dried in vacuum. Thus was obtained 18.3 g of a pale green powder of an organic phyllo-nickel/titanosilicate.

What is claimed is:

1. An organic phyllotitanosilicate comprising:
    a sheet of tetrahedrons, said tetrahedrons comprising a first center atom selected from the group consisting of at least one of Si, Al, Fe, Ge and P, and containing Si, wherein a part or all of the first center atom is covalently bonded to an organic group; and
    a sheet of octahedrons, said octahedrons comprising Ti and a metal besides Ti as a second center atom, said second center atom being occupied by not less than 5 atomic % and less than 100 atom % of said Ti and by the balance of said metal besides Ti, said sheets of tetrahedrons and octahedrons being joined to form a layered structure.

2. The organic phyllotitanosilicate as claimed in claim 1, wherein said metal is at least one metal selected from the group consisting of Mg, Al, Ni, Co, Cu, Mn, Fe, Li, V and Zr.

3. The organic phyllotitanosilicate as claimed in claim 1, wherein the sheet of octahedrons is sandwiched between two of the sheets of tetrahedrons to form the 2:1 structure of an organic phyllotitanosilicate.

4. The organic phyllotitanosilicate as claimed in claim 1, wherein said organic group is an alkyl group.

5. The organic phyllotitanosilicate as claimed in claim 1, wherein said organic group has a polymerizable functional group at a terminal.

6. The organic phyllotitanosilicate as claimed in claim 5, wherein said polymerizable functional group is at least one selected from the group consisting of an acrylic group, a methacrylic group, an epoxy group, an amino group with a carboxyl group, and a mercapto group with a functional group polymerizable therewith.

7. A method for producing an organic phyllotitanosilicate of claim 1, comprising:
    a first step of dissolving or dispersing the following components (a) and (b) and optionally (c) in the following liquid (d) to obtain a solution or a dispersion; and
    optionally a second step of aging the solution or the dispersion after the first step, thereby obtaining said organic phyllotitanosilicate from the solution or the dispersion:
    (a) an organoalkoxysilane having an alkoxy group and an organic group;
    (b) an inorganic acid salt of a metal including Ti, an organic acid salt of a metal including Ti, or an alkoxide of a metal including Ti wherein Ti accounts for not less than 5 and less than 100% in terms of the atomic ratio of Ti atoms to all metal atoms;
    (c) a silicon alkoxide having an alkoxy group; and
    (d) a single inorganic polar solvent, a single organic polar solvent, or a mixed solvent of at least two polar solvents.

8. The method for producing an organic phyllotitanosilicate as claimed in claim 7, wherein said metal including Ti in (b) comprises Ti and at least one selected from the group consisting of Mg, Al, Ni, Co, Cu, Mn, Fe, Li, V and Zr.

9. The method for producing an organic phyllotitanosilicate as claimed in claim 7, wherein the molar ratio of said component (b) to said component (a) is from 1/3 to 2/1.

10. The method for producing an organic phyllotitanosilicate as claimed in claim 9, wherein said molar ratio is from 1/2 to 1/1.

11. The method for producing an organic phyllotitanosilicate as claimed in claim 7, wherein the solvent (d) is a dewatered lower alcohol or acetone.

12. A shaped body of an organic phyllotitanosilicate of claim 5 having a desired shape and an organic group bonded to each other through the polymerization of a functional group on the organic group.

13. A method for producing a shaped body of an organic phyllotitanosilicate of claim 1, comprising:
    a first step of dissolving or dispersing the following components (a) and (b) and optionally (c) in the following liquid (d) to obtain a solution or a dispersion; and
    optionally a second step of aging the solution or the dispersion after the first step, thereby obtaining the organic phyllotitanosilicate from the solution or the dispersion, and thereafter shaping the obtained organic phyllotitanosilicate to a desired shape and polymerizing the functional group of the organic group to bond the organic group each other:
    (a) an organoalkoxysilane having an alkoxy group and an organic group containing a polymerizable functional group;

(b) an inorganic acid salt of a metal including Ti, an organic acid salt of a metal including Ti, or an alkoxide of a metal including Ti wherein Ti accounts for not less than 5 and less than 100% in terms of the atomic ratio of Ti atoms to all metal atoms;

(c) a silicon alkoxide having an alkoxy group; and (d) a single inorganic polar solvent, a single organic polar solvent, or a mixed solvent of at least two polar solvents.

14. The method as claimed in claim 13, wherein said metal including Ti in (b) comprises Ti and at least one selected from the group consisting of Mg, Al, Ni, Co, Cu, Mn, Fe, Li, V and Zr.

15. The method as claimed in claim 13, where in the desired shape is filmy or a specific shape formed with a mold or a frame.

* * * * *